United States Patent
Coleman

[15] 3,654,721
[45] Apr. 11, 1972

[54] TROT LINE GUIDE DEVICE FOR BOATS

[72] Inventor: Wesley B. Coleman, 4723 West Alabama, Apt. 4, Houston, Tex. 77027

[22] Filed: Sept. 21, 1970

[21] Appl. No.: 73,885

[52] U.S. Cl. ................................................. 43/6.5, 43/27.4
[51] Int. Cl. ...................................................... A01k 79/00
[58] Field of Search ........................ 43/27.4, 1, 4, 6.5, 5, 4.5, 43/43.1, 43.13, 54.5

[56] References Cited

UNITED STATES PATENTS

| 1,175,602 | 3/1916 | Chidley | 43/27.4 |
| 2,488,451 | 11/1949 | Ursich | 43/6.5 |
| 3,419,990 | 1/1969 | Lewis et al. | 43/6.5 |

*Primary Examiner*—Warner H. Camp
*Attorney*—Charles E. Lightfoot

[57] ABSTRACT

A line guide device for attachment to boats to guide a trot line along one side of the boat as the boat moves along the line. The guide device is provided with longitudinally spaced peripherally grooved wheels over which the line passes with the spaced apart leaders on the line hanging downwardly therefrom, and guide means is provided for retaining the line in the grooves of the wheels and for guiding the leaders in their downwardly extending positions past the wheels to prevent tangling of the leaders in the equipment or snagging of the hooks.

6 Claims, 6 Drawing Figures

PATENTED APR 11 1972　　　　　　　　　　　　　　　　3,654,721

Wesley B. Coleman
INVENTOR

BY Charles E. Lightfoot
ATTORNEY

TROT LINE GUIDE DEVICE FOR BOATS

BACKGROUND OF THE INVENTION

In trot line fishing as usually conducted, it is customary to make use of a long line to which numerous branch lines or leaders are connected at more or less uniformly spaced intervals along the line, each such leader carrying a hook.

The trot line is paid out into the water with the hooks suitably baited and is retrieved from time to time to collect any fish which may have been caught, and to rebait the hooks when necessary.

In order to avoid pulling in the line and again playing it out each time the fish are to be collected and the hooks rebaited, the line is frequently anchored at one end, paid out from a boat as the same moves along to extend the line along a suitable fishing location and suitably anchored at the other end. With the line thus extended, the boat is then moved along the line with the line extending up from the anchored ends to the boat so that any fish caught may be removed from the hooks and the hooks rebaited.

The line usually passes into the bow of the boat as the boat moves along the line and passes out again at the stern and the fish are removed and hooks rebaited in the boat, the boat being moved slowly along the line or being moved from time to time to a new position along the line to provide time for operating on the hooks.

The pulling of the line into the boat and paying out the line therefrom in operating a trot line in this matter often results in tangling of the line or the catching of the hooks in objects aboard the boat or even the snagging of persons engaged in operating the line, and no satisfactory means has been provided heretofore for supporting and guiding a trot line in an extended condition along a boat to allow the line to be operated upon without danger of tangling or of snagging the hooks on objects aboard the boat while removing fish therefrom and rebaiting the hooks.

SUMMARY OF THE INVENTION

Briefly described, the line guide of the invention comprises an elongated frame member adapted to be attached to a boat to extend along one side of the boat and having a pair of longitudinally spaced, peripherally grooved, wheels rotatably mounted on the frame for rotation about horizontally extending axes and over which the trot line may pass as the boat moves along the line with the leaders of the line hanging downwardly therefrom in position to be handled by a person in the boat. An inverted U-shaped guide is mounted on the frame outwardly beyond each wheel in position to guide the line in its passage over the wheels and to prevent the line from being pulled laterally out of the grooves of the wheels. Additional o guide means of generally plate-like character are mounted on the frame extending vertically in outwardly spaced relation to the wheels to engage the leaders and guide the same past the wheels as the boat moves along the line to prevent snagging of the hooks or entangling of the leaders in the equipment.

The object of the invention is to provide line guide means carried on a boat to guide a trot line along one side of the boat as the boat moves along the line to position the line with the leaders hanging free for the convenient removal of fish therefrom and the rebaiting of the hooks by a person in the boat without danger of entangling the line or snagging the hooks.

DETAILED DESCRIPTION OF A PARTICULAR EMBODIMENT OF THE INVENTION

Figure 1:
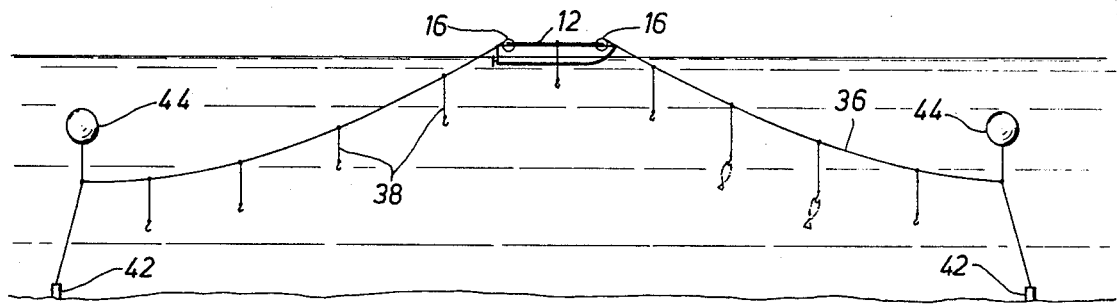
FIG. 1 is a side elevational view, on a greatly reduced scale, illustrating a preferred embodiment of the invention and showing the manner in which the same is used.
Figure 2:
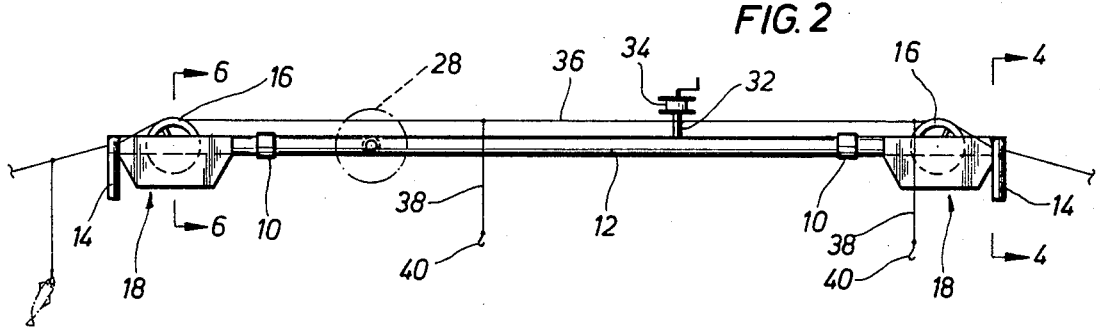
FIG. 2 is a side elevational view of the line guide device of the invention on a somewhat larger scale.
Figure 3:
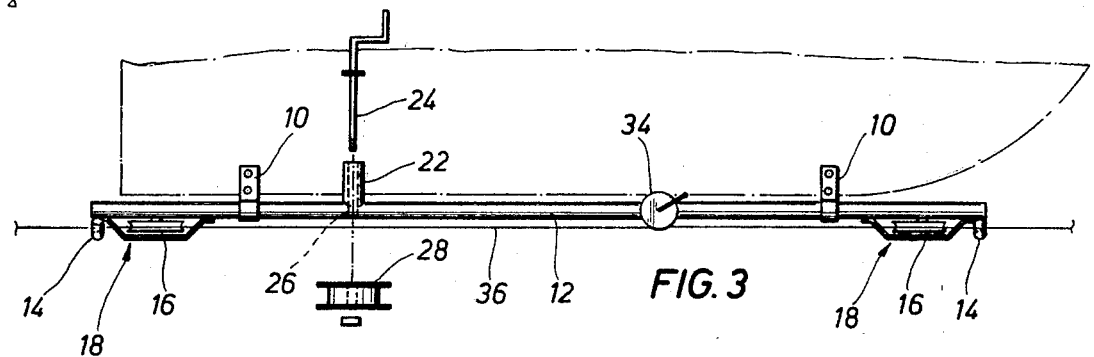
FIG. 3 is a top plan view of the invention is illustrated in FIG. 2.
Figure 5:
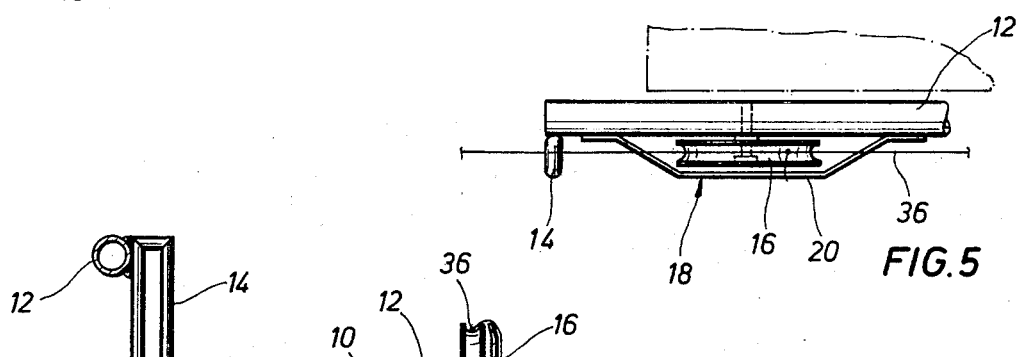
FIG. 5 is a fragmentary top plan view on an enlarged scale showing a portion of the line guide and illustrating the manner in which the line is guided thereby; and, FIG. 6 is a cross sectional view taken along the line 6 — 6 of FIG. 2, looking in the direction indicated by the arrows, and on a somewhat enlarged scale.
Figures 4, 6:
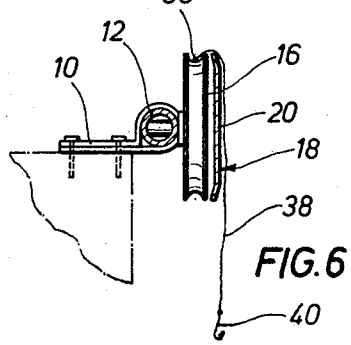
FIG. 4 is a cross sectional view, taken along the line 4 — 4 of FIG. 2, looking in the direction indicated by the arrows.

Referring now to the drawings in greater detail, the trot line guide device of the invention is illustrated in connection with its use on a boat of any suitable type, the device extending along one side of the boat and being removably secured thereto, as by means of clamps 10 suitably spaced along the device and attached thereto by means of screws or otherwise.

The guide device comprises an elongated support member or frame 12 to which the clamps 10 are attached to support the member alongside of the boat in a position preferably parallel to and extending slightly beyond the side of the boat. The member 12 may take the form of a section of pipe or tubing or the like, and carries at each end a guide element 14 of inverted U-shape preferably extending horizontally outwardly from the boat away from the member 12 and secured thereto adjacent the bottom of the U.

A grooved wheel or pulley 16 is rotatably mounted on the support member 12 near each end thereof in longitudinally inwardly spaced relation to the guide element 14. The wheels are mounted for rotation about a horizontal axis in a vertical plane.

Adjacent each end of the frame 12, guard member or plate 18 extends from the guide 14 past the wheel 16 in outwardly spaced relation thereto and is attached at its opposite ends to the frame. The guards 18 may be of generally plate-like construction, each formed with an outwardly offset or bowed portion 20 mediate its ends and extending past the wheel 16, in outwardly spaced relation thereto, the wheel extending upwardly somewhat above the upper edge of the guard.

Suitable bearing means, such as the tubular element 22, is carried by the frame member 12 extending laterally therefrom through which a shaft 24 may be rotatably inserted through an opening 26 in the member and upon which a winding spool 28 is mounted for rotation therewith. The shaft 24 may be provided with a crank or handle for use in turning the spool 28 which is intended to carry the trot line wound thereon when the line is not in use.

The frame member may also have a bearing 32 similar to the above described bearing means for a spool or reel 34 upon which a separate line is wound for use with grappling means for retrieving the trot line when the same has been extended in its anchored condition as hereinafter described.

In making use of the invention, a trot line 36 fully equipped with spaced apart leaders 38 and hooks 40 may be provided with a heavy weight 42 at one end which is lowered to the bottom and the line paid out along a desired path, after which another heavy weight 42 may be attached to the other end of the line and allowed to sink to the bottom to keep the line extended. Suitable floats 44 such as strong inflated balloons or the like, may be attached to the line near the weights to suspend the line at some distance above the bottom between the weights to suspend the hooks at some distance clear of the bottom. With the line thus paid out and the hooks baited, the line may be retrieved when desired by the use of a grappling hook and line, and the line extended through the U-shaped guides 14 and over the wheels 16 to allow the hooks to dangle downwardly along the line as the boat moves along the line. The leaders 38 will be guided past the wheels 16 by the guide plates 18 so that the leaders will be free to be handled by persons in the boat to remove fish and rebait the hooks without bringing the hooks aboard, so that there will be little danger of tangling the line or snagging objects with the hooks.

The line 36 may be initially retained in the grooves of the wheels 16 and through the guides 14 while paying out the line, so that it will not be necessary to retrieve the line with a grapple. When the line is to be left in the water for long periods of time, however, the grapple may be used to retrieve the line when the boat returns to the fishing ground.

I claim:
1. In a trot line guide device,
   a pair of peripherally grooved wheels;
   means for rotatably supporting the wheels in longitudinally spaced apart relation for rotation about axes disposed substantially horizontally on a boat;
   guide means for each wheel positioned for engagement with a fishing line to hold the line against movement out of the groove of the wheel when the line is extended through the guide means and over the wheels in the grooves thereof; and,
   means positioned for engagement with leaders on the line to cause the leaders to pass the wheels in horizontally spaced relation thereto as the line moves over the wheels.
2. The trot line guide device as claimed in claim 1 wherein said means for supporting said wheels includes an elongated support member extending longitudinally of the boat; and,
   means connecting the support member to the boat along one side of and outwardly spaced from the boat.
3. The trot line guide device as claimed in claim 2 wherein said wheels extend upwardly above said support member.
4. The trot line guide device as claimed in claim 2 wherein said means positioned for engagement with said leaders are of plate-like construction attached to said support member and extending laterally away from said member outwardly beyond said wheels.
5. The trot line guide device as claimed in claim 2, wherein said guide means is of inverted U-shape.
6. The trot line guide device as claimed in claim 2 wherein said means for supporting said wheels is tubular and said guide means and said means positioned for engagement with said leaders are supported on and extend laterally outwardly therefrom away from the boat.

* * * * *